United States Patent [19]

Finster et al.

[11] 3,902,891

[45] Sept. 2, 1975

[54] ALUMINOTHERMIC REACTION MIXTURE BASED ON COPPER OXIDE AND IRON OXIDE

[75] Inventors: Theodor Finster, Hattingen; Hans-Dieter Fricke, Essen-Stadtwald; Horst Schümann, Mülheim, all of Germany

[73] Assignee: Th. Goldschmidt AG, Germany

[22] Filed: May 20, 1974

[21] Appl. No.: 471,757

[30] Foreign Application Priority Data

June 29, 1973 Germany.......................... 2333143

[52] U.S. Cl. .......................................... 75/27; 75/94
[51] Int. Cl. ........................ C21b 15/02; C22b 9/10
[58] Field of Search ..................... 75/27, 23, 72–74, 75/94; 148/26

[56] References Cited
UNITED STATES PATENTS

| | | | |
|---|---|---|---|
| 2,229,045 | 1/1941 | Cadwell | 75/27 |
| 2,282,175 | 5/1942 | Emerson | 148/26 |
| 2,421,029 | 5/1947 | Magram | 75/27 |
| 3,033,672 | 5/1962 | Rejdak | 75/27 |
| 3,116,141 | 12/1963 | Rylander | 75/27 |

*Primary Examiner*—Peter D. Rosenberg
*Attorney, Agent, or Firm*—James E. Bryan

[57] ABSTRACT

This invention relates to an aluminothermic reaction mixture for the preparation of a metallic melt comprising copper and iron, particularly for welding copper cables or grounding cables to rails, comprising 45 to 52 parts by weight of copper oxide with an oxygen content of 11 to 15% by weight, 35 to 40 parts by weight of iron oxide with an oxygen content of 26 to 30% by weight, and 12 to 15 parts by weight of aluminum granules having an average grain size of 0.2 to 0.3 mm.

4 Claims, No Drawings

ALUMINOTHERMIC REACTION MIXTURE BASED ON COPPER OXIDE AND IRON OXIDE

The present invention relates to an aluminothermic reaction mixture, for the preparation of a metallic melt, composed of copper and iron, particularly useful for welding copper cables or grounding cables to rails.

In the aluminothermic reaction, use is made of the great affinity of aluminum to oxygen and, during the formation of aluminum oxide, heat is generated so that the metal of the metallic oxide which furnishes the oxygen is melted down during the reduction. Best known is the reaction between iron oxide and aluminum in which additives, such as, for example, Mn, Si, and rare earth metals, may be added to the reaction mixture in order that one may obtain an iron melt or an iron alloy melt that is employed in large volume for welding rail ends, for repair-welding operations, and the like.

A modified version of the aluminothermic process, which has been utilized technically only recently, includes replacing the iron oxide with copper oxide, whereby copper melts are obtained which are employed for specific purposes. An example of such an intended purpose is the welding of copper cables to rails in order to bridge rail joints, and hence in order to assure the current transfer. Another application of aluminothermic copper cable welding is in the welding-on of current bridges between the wheel spider or spoke wheel center and the wheel tires in streetcar wheels equipped with rubber suspensions. However, grounding cables of other metals, for example steel, also may be welded together with such copper melts. Information concerning aluminothermic welding based on copper oxide is found in the periodical "Eisenbahntechnische Rundschau" (Railroad-Technical Review), Issue 12, 1969, pages 518, et sequitur.

When carrying out copper cable welding in actual practice, however, it has been found in some instances that the welds have pores which impair the mechanical strength of the welds and the current passage as well.

It has been found that the porosity of the aluminothermically-produced copper welds can be eliminated with certainty when a substantial part of the copper oxide is replaced with iron oxide. In this connection it is necessary that, for the copper oxide as well as for the iron oxide, — since what is involved are not chemically pure compounds but, in the standard case, powders and chips which are obtained during working of the metal and which are partially only superficially oxidized — specific oxygen contents be set by treatment in a rotary kiln at elevated temperatures.

The reaction mixture according to the present invention is composed of 45 to 52 parts by weight of copper oxide with an oxygen content of 11 to 15% by weight,
35 to 40 parts by weight of iron oxide with an oxygen content of 26 to 30% by weight, and
12 to 15 parts by weight of aluminum granules having an average grain size of 0.2 to 0.3 mm,
in addition to conventional additives.

Due to the admixture of iron oxide, the aluminothermic reaction is braked. The consumption velocity is coordinated to the respectively prevailing conditions by a suitable composition of the portion and variation of the grain size.

It was surprisingly found that a weld made from the inventive reaction mixture is free from undesired pores.

An additional advantage afforded with the use of the inventive reaction mixture is that fissures which are observed on occasion, when iron-free copper melts are used for welding, in the transition from the welding material to the base metal are no longer produced.

By means of additives partly known per se, the reaction mixture may be further improved in the properties thereof as far as application techniques are concerned. Particularly preferred in this connection is the addition of 1 to 3 parts by weight of an iron/manganese alloy, in a weight ratio of 55 : 45, per 100 parts by weight of the base mixture.

Of additional advantage is the admixture to the reaction mixture of 3 to 4.5 parts by weight of a calcium/silicon alloy in a weight ratio of 1 : 2 to 1 : 2.6, in addition to the usual impurities, such as, for example, Fe, Al, C and O. The admixture of the calcium/silicon alloy may be in addition to the admixture of the iron/manganese alloy.

Finally, the preferred addition is of 0.1 to 0.5 part by weight of carbon having a grain size of <0.2 mm, which also enhances the degassing of the melt.

Also, it is possible, of course, to add to the welding portions the known supplements which improve the welding material in the desired manner, depending upon the respective requirements.

Typical examples of reaction mixtures according to the present invention are enumerated hereinbelow (all parts are parts by weight):

| Content Materials | Sample 1 (parts) | Sample 2 (parts) | Sample 3 (parts) |
| --- | --- | --- | --- |
| copper oxide with an oxygen content of 14% by weight | 45 | 41 | 52 |
| iron oxide with an oxygen content of 29% by weight | 40 | 38 | 35 |
| aluminum, grain size 0.24 mm | 15 | 13 | 13 |
| iron/manganese alloy 55/45 | 2 | 2 | 1.5 |
| calcium/silicon alloy 29.4/70.6 | 4.5 | 3.8 | 4 |
| carbon <0.2 mm | 0.2 | 0.2 | 0.3 |

It will be obvious to those skilled in the art that many modifications may be made within the scope of the present invention without departing from the spirit thereof, and the invention includes all such modifications.

What is claimed is:

1. An aluminothermic reaction mixture for the preparation of a metallic melt comprising copper and iron, particularly for welding copper cables or grounding cables to rails, comprising
   45 to 52 parts by weight of copper oxide with an oxygen content of 11 to 15% by weight,
   35 to 40 parts by weight of iron oxide with an oxygen content of 26 to 30% by weight, and
   12 to 15 parts by weight of aluminum grandules having an average grain size of 0.2 to 0.3 mm.

2. A reaction mixture according to claim 1 including, in addition, 1 to 3 parts by weight of an iron/manganese alloy in a weight ratio of 55 : 45.

3. A reaction mixture according to claim 1 including, in addition, 3 to 4.5 parts by weight of a calcium/silicon alloy in a weight ratio of approximately 1 : 2 to 1 : 2.6.

4. A reaction mixture according to claim 1 including, in addition, 0.1 to 0.5 part by weight of carbon having a grain size of <0.2 mm.

* * * * *